July 7, 1953
R. F. THORNTON
2,644,698
TANDEM AXLE SUSPENSION CONSTRUCTION
Filed Aug. 10, 1948
2 Sheets-Sheet 1
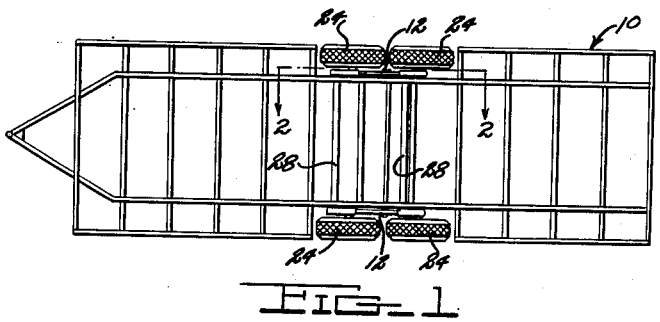
FIG-1
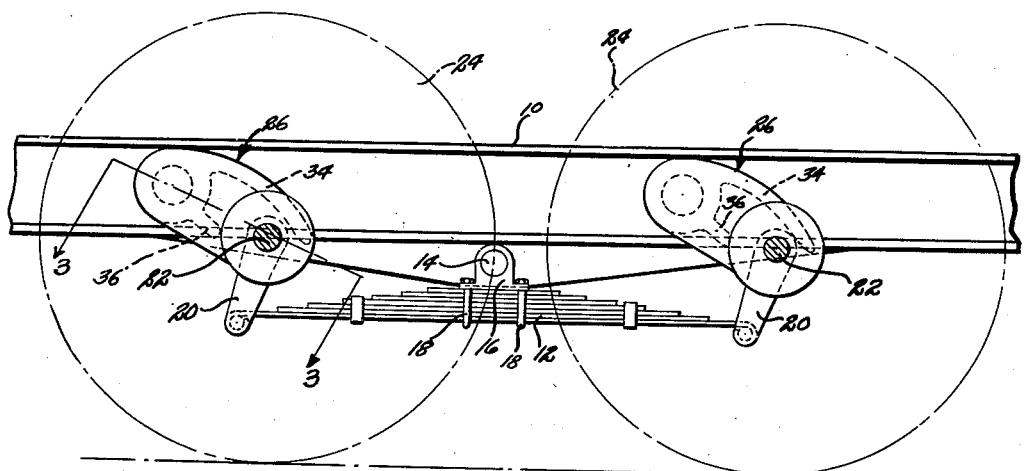
FIG-2
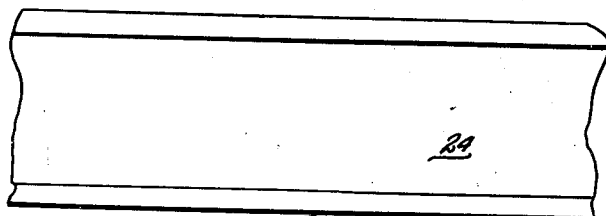
FIG-3
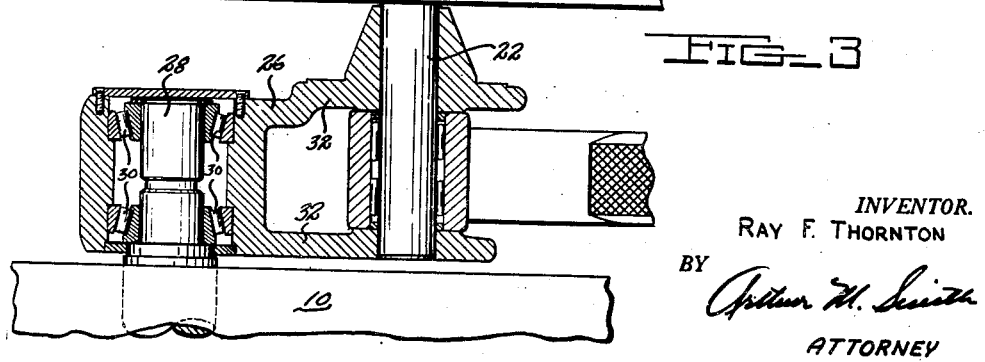
INVENTOR.
RAY F. THORNTON
BY
ATTORNEY July 7, 1953  R. F. THORNTON  2,644,698
TANDEM AXLE SUSPENSION CONSTRUCTION
Filed Aug. 10, 1948  2 Sheets-Sheet 2

INVENTOR.
RAY F. THORNTON
BY
ATTORNEY

Patented July 7, 1953

2,644,698

UNITED STATES PATENT OFFICE 2,644,698

TANDEM AXLE SUSPENSION CONSTRUCTION

Ray F. Thornton, Dexter, Mich.

Application August 10, 1948, Serial No. 43,517

2 Claims. (Cl. 280—104.5)

This invention relates to a suspension construction between a frame structure and road wheels and more particularly to a combined wheel suspension and spring structure for tandem axle vehicles or the like, here disclosed as embodied in a trailer unit.

It is an object of the present invention to provide a suspension between a vehicle frame and road wheels in which road shock is dampened in the suspension structure before it is transmitted to the vehicle frame; the draw bar pull is stabilized by eliminating intermittent, excessive pull forces, heretofore caused by the counteraction of vertical forces produced by the road wheels rising and falling as a result of bumps or holes in a road bed; stabilizing load conditions; and eliminating twisting of the frame structure.

Another object of the invention is to provide a tandem axle and spring construction in which the road wheels are independently supported relative to the vehicle frame but are interconnected through the load supporting spring for the frame.

A further object of the invention is to provide a suspension structure between a vehicle frame and road wheels in which the torque force resulting from brake application is utilized to draw the frame forwardly and downwardly.

More specifically, the invention is here disclosed as embodied in a chassis having a pair of longitudinally spaced wheels mounted in tandem on each side of the chassis frame, with a leaf spring having its opposite ends supporting each pair of wheels and with the central portion of the spring pivotally mounted on the chassis frame.

A link having its opposite ends pivotally supported to a wheel axle and one end of a leaf spring respectively is provided for each of the wheel axles and another link having its opposite ends pivotally supported to the wheel axle and the chassis frame respectively is provided for each wheel mounting. Thus a pair of wheels, in tandem, are pivotally movable independently of each other about a central load supporting bearing secured to the central portion of the longitudinally extending leaf spring. The leaf spring interconnects the pair of wheels for flexible movement independently of each other and independently of the chassis frame.

Other objects and advantages of the invention will more fully appear from the following description taken in connection with the accompanying drawings in which:

Fig. 1 is a top plan view of a trailer frame illustrating an embodiment of the invention;

Fig. 2 is a fragmentary sectional view taken on line 2—2 of Fig. 1 showing the suspension structure on enlarged scale;

Fig. 3 is an enlarged sectional view taken on line 3—3 of Fig. 2.

Figures 4, 5:
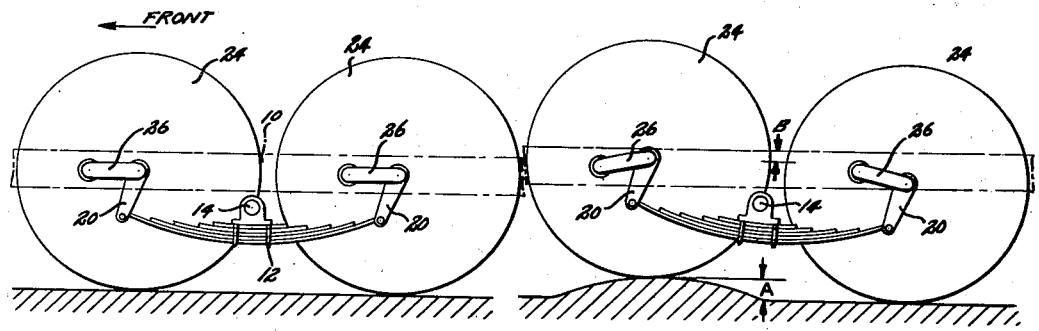

Figs. 4 to 8 inclusive are diagrammatic views illustrating different road conditions and showing the positions of the moving parts under each condition; Fig. 4 showing a level road, Fig. 5 the front wheel raised, Fig. 6 the front wheel dropped, Fig. 7 the rear wheel raised, and Fig. 8 the rear wheel dropped.

Before explaining the present invention in detail, it is to be understood that the invention is not limited in its application to the details of construction and arrangement of parts illustrated in the accompanying drawings, since the invention is capable of other embodiments and of being practiced or carried out in various ways Also it is to be understood that the phraseology or terminology employed herein is for the purpose of description and not of limitation.

Referring to the drawings, I have illustrated one embodiment of the invention as applied to the load carrying axle and frame of a tandem axle vehicle such for example as a trailer, it is to be understood, however, that the same suspension may be applied to other types of vehicles.

The frame 10 as here shown is constructed of channel members and is supported by my improved suspension means.

On each side of the trailer frame 10 I have arranged a multiple leaf spring 12, which extends longitudinally of the trailer and is pivotally supported, at its center, to a load supporting cross shaft 14 which is rigidly carried by the frame 10. Suitable bearings are provided between the shaft 14 and a journal block 16 which is secured to the leaf spring by U-bolts 18.

Each of the opposite ends of the leaf spring 12 is pivotally secured to one end of a shackle arm 20. The opposite end of each shackle arm 20 is pivotally secured to a short axle 22 which rotatably supports a road wheel 24. Each shackle arm 20 is supported on the chassis frame by a crank arm 26 having one end pivotally secured to the axle 22 and having its opposite end rotatably supported on a cross shaft 28, rigidly secured to the frame 10. The cross shafts 14 and 28 are rigidly supported at the opposite sides of the frame 10.

By this construction and arrangement of parts each road wheel 24 is movable independently of the others relative to the frame 10. The load on the frame is thus suspended between two sets of longitudinally spaced supports. The wheels 24 are mounted in conventional load carrying axle bearings and the shackle arms 20 are mounted in bearings which are fixed to the vehicle frame 10. The wheels 24 are thus supported by a knee action connection to the frame 10 which is not dependent upon the movements of the spring 12.

The crank arm 26 is preferably formed as a one-piece hollow box section but may be formed of other types of construction. Tapered roller bearings 30 are provided on the ends of the cross shafts 28 and pivotally support the crank arms 26. The axle 22 is fixed to the outer free end of the crank arm 26 and thus may pivot through an arc whose center lies on the axis of the shaft 28. The wheel 24 is rotatably mounted on bearings carried by the axle 22. The axle 22 is non-rotatably mounted in side flanges 32 of the crank arm 26 and the shackle arm 20 is pivotally mounted between the flange 32 on the axle 22.

The side flanges 32 are integrally connected by an upper roof 34 which overhangs the outer surface of the shackle arm 20. The outer end of the roof 34 serves as a stop for limiting the swinging movement of the shackle 20 in a counterclockwise direction. A flange 36 on the arm 26 acts as a stop for limiting the swinging movement of the shackle 20 in a clockwise direction. The knee action movement of the wheels 24 occurs independently of the action of the spring 12, consequently, the spring 12 is free to absorb shocks from the road while the wheels 24 are allowed to rise or fall as necessary to follow the contours of the road.

It has been found that the shackle arm length and the crank arm length should be substantially equal and that the length of each should have a relation to the wheel diameter. As one example, if a wheel diameter of thirty inches is used each arm length should be approximately six inches. Such a proportion has been found to result in a balanced system. I have also found it desirable to support the leaf spring center on the frame at a point located below the centers of the wheels.

Referring to the diagrammatic illustrations, Figs. 4 to 8 inclusive, different positions of the wheels 24 have been shown to illustrate more clearly the advantages obtained by the construction. When one wheel 24 strikes a bump in the road, that is an upper projection, the wheel 24 pivots away from the bump as it rises. The vertical movement of the wheel 24 is one-half the amount that the frame 10 is tipped, due to the fact that the wheels 24 are mounted at opposite ends of the leaf spring 12 and the distance between the wheels 24 is twice the distance from one wheel to the center of the spring.

Figures 6, 7:
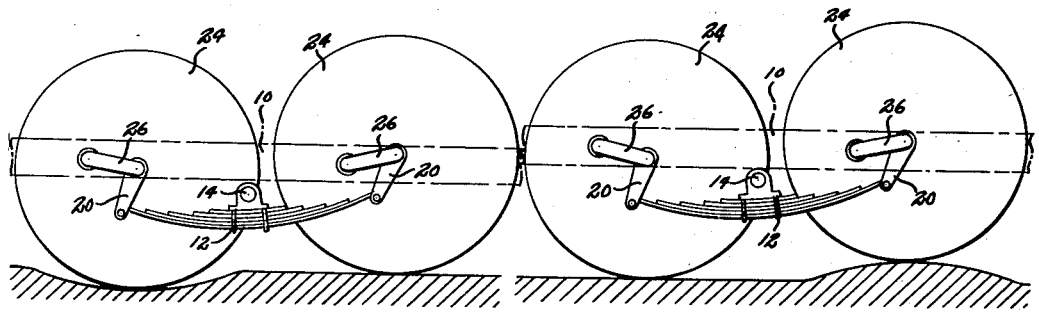
Figure 8:
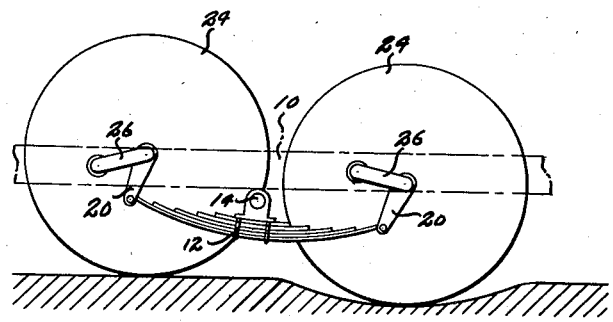

It will be noted that there is a different direction of movement of the arms for each wheel movement. In Fig. 5, the front wheel has been shown raised and the arms carrying the front wheel have moved upwardly and the arms carrying the rear wheel have moved downwardly. If the conditions are reversed, that is, when the front wheel has dropped, as illustrated in Fig. 6, the front arms are moved downwardly and the rear arms are moved upwardly. By such an arrangement of parts, it is possible to equalize the load on the unit and distribute wear equally on the parts. The load is equal on the wheels 24 because the mounting of the spring 12 as shown gives a walking beam effect to transmit the loads from one wheel to the other. The center of the walking beam trunnion is below the crank arm spindles to give a further equalization of the load.

The ends of the springs 12, when loaded, act as resilient levers which permit independent knee action of the wheels 24 under severe road shock and since the resilient levers of the spring are connected together and both pivotally mounted on the frame, the shock from one wheel is transmitted to the other without shock to the frame.

During brake applications the crank arms 26 act as torque arms when the brakes are applied and exert a force tending to pull the frame downwardly toward the road.

In Fig. 4 the wheels have been shown on a level road and under normal load. The crank arms 26 are extended rearwardly and are substantially in a horizontal plane. The shackle arms 20 extend downwardly. In Fig. 5 the front wheel has been shown raised pivoting the spring 12 about its center at the load supporting hub 14. The front crank arm 26 has been pivoted upwardly and the rear crank arm 26 has been pivoted downwardly. It will be noted that when the front wheel 24 has been raised a distance, indicated at A, the frame has been raised a distance, indicated at B which is substantially one-half the distance of A. Fig. 6 shows the position of the arms, spring and frame when the front wheel is dropped lower than the rear wheel, and Figs. 7 and 8 respectively show the position of the parts when the rear wheel has been raised and dropped.

The invention has been illustrated and described in connection with a trailer frame but it may be applied to power driven vehicles. If desired the units may be motorized and the wheel axles 22 may be driven either individually or in unison. In such installations the driving gears for the axle would be so mounted as to oscillate as a unit through the arc of the crank arms 26.

The invention has been described in one embodiment, yet it will be understood that it may include various modifications as to size, shape, and arrangement of parts without departing from the spirit of my invention and it is not my intention to limit its scope other than by the terms of the appended claims.

I claim:

1. A suspension construction for a vehicle comprising, a frame structure, a pair of longitudinally spaced wheels arranged in tandem at the opposite sides of said frame, a stub axle for each wheel, a shackle arm for each axle, a leaf spring interconnecting each pair of shackle arms at one side of said frame and pivotally supported on said frame, and a crank arm pivotally connected between each of said axles and said frame the length of said crank arm being substantially the same as the length of one of said shackle arms.

2. A suspension construction for a vehicle comprising, a frame structure, a pair of longitudinally spaced stub axles secured to said frame, a crank arm pivotally mounted at the outer end of each axle, a shackle arm pivotally mounted at the free end of said crank arm, a leaf spring connecting a pair of shackle arms at the opposite sides of said frame, a pivotal connection for said spring to said frame, and road wheels rotatably mounted on an axis common to the axis of said crank arm and said shackle arm connection, said crank arm and shackle arm having a length between their pivotal axes of substantially ⅕ of the diameter of said road wheels.

RAY F. THORNTON.

References Cited in the file of this patent

UNITED STATES PATENTS

| Number | Name | Date |
|---|---|---|
| 1,902,712 | Leipert | Mar. 21, 1933 |
| 2,131,083 | Winn | Sept. 27, 1938 |
| 2,284,665 | Larison | June 2, 1942 |
| 2,386,988 | Sullivan | Oct. 16, 1945 |
| 2,459,372 | Fraunfelder | Jan. 18, 1949 |

FOREIGN PATENTS

| Number | Country | Date |
|---|---|---|
| 357,290 | Great Britain | Sept. 24, 1931 |